W. A. LIGHTHALL.
COMBINED HEATER, CONDENSER, AND FILTER.
No. 36,010.                                    PATENTED JULY 29, 1862.
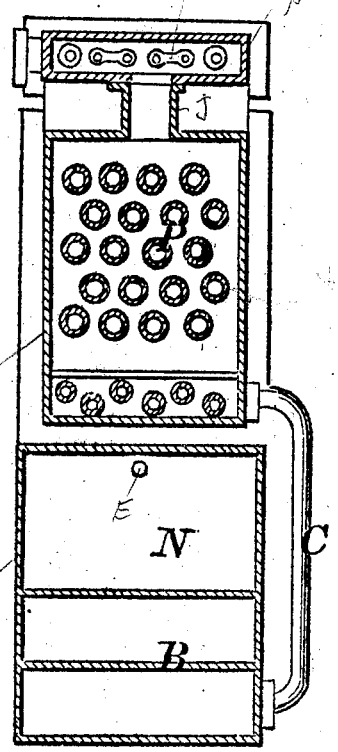
TAKEN FROM PATENT OFFICE REPORT
1862 VOL. IL
ONLY DRAWING ACCESSIBLE (1911)

UNITED STATES PATENT OFFICE.

WILLIAM A. LIGHTHALL, OF NEW YORK, N. Y.

IMPROVED COMBINED HEATER, CONDENSER, AND FILTER.

Specification forming part of Letters Patent No. 36,010, dated July 29, 1862.

*To all whom it may concern:*

Be it known that I, WILLIAM A. LIGHTHALL, of the city, county, and State of New York, have invented a certain new and useful arrangement of a portable condenser, heater, filter, and tank, for making potable water from salt or other unpotable water; and I do hereby declare that the following is a full and exact description of the same, reference being had to the accompanying drawings, and to the letters of reference marked thereon, in which—

Figure 1 is a central vertical longitudinal section; Fig. 2, a cross-section through the line $x\ x$, Fig. 1; and Fig. 3, a plan view of the heater detached with its cover removed.

The purpose and object of my invention is to arrange and combine the condenser, (for making potable water from salt or other unpotable water,) the heater, (for heating the supply of feed-water to the boiler,) the filter, (for extracting from the condensed water its empyreumatic qualities,) and the tank (for holding and containing the condensed water, as made, to be run or pumped off to other receivers or reservoirs, as may be required) in the smallest possible space and in the nearest connection with each other; and it consists in placing and arranging these several parts together in the manner hereinafter described, and as shown in the accompanying drawings.

A is the base of the apparatus, in the lower portion of which is placed and located the filter B, which is filled with charcoal in each of the two portions into which it is divided, the purpose of the same being to abstract from the condensed water run into it, the empyreumatic qualities peculiar to condensed or distilled water. The condensed water is run into the filter at one end of its bottom section through the pipe C, and after traversing and passing through the charcoal contained in that section is passed into and through the upper section, (and the charcoal contained therein,) and from thence into the tank N, from which it is taken off (either by gravity or by the suction of a pump, as may be required in the locality in which the apparatus may be placed) through the nozzle E.

F is the condenser, of the form and arrangement described in the Letters Patent of the United States granted to me under date of April 22, 1862, which is located on top of and is secured to the base A, as shown, the condensed (or distilled) water being taken off and away from it and carried into the filter B through the pipe C, as before described.

G is the heater, located upon and attached to the top of the condenser, which is fitted in its interior with the series of pipes H, through which the feed-water is passed from the feed-pump to the boiler, and into which steam is exhausted from the feeding, cooling, and supply pumps (or is supplied from the boiler direct by a separate nozzle) through the nozzles $a\ a'\ a^2$, for the purpose of heating the feed-water before it enters the boiler, in order that a saving of fuel may be effected thereby over what would be required to be used were the feed-water to be fed to the boiler cold. The feed-water is supplied to the heating-pipes H through the connection $b$, and is taken off to the boiler through the connection $c$, (or vice versa,) as may be desired. The drip of water produced in the interior of the case of the heater (by the condensation of the steam in coming in contact with the surfaces of the case and the surfaces of the heating-tubes) is taken off into the condenser F through the connecting-pipe J, as is also the uncondensed steam from the heater, which passes into the condenser and is condensed therein by the cooling-water passing through the tubes K, as is set forth in the Letters Patent before named. The incondensable vapor from the condenser is passed off from the condenser by the nozzle $d$. By this arrangement the whole of the parts of the apparatus are combined in a space no greater than that required to be occupied by the condenser alone, except in its height, which can always be obtained, and the action of the whole and the supervision and control of the same on the part of the attendant engineer can be more readily watched and cared for than if the same parts were separated and located distinct and apart from each other.

What I claim as my invention, and desire to secure by Letters Patent, is—

The combination of the tank N, filter B, condenser F, and heater G, when arranged in relation to each other, in the manner and for the purposes herein set forth.

WM. A. LIGHTHALL.

Witnesses:
FRANCIS S. LOW,
JOHN G. BOLANDER.